United States Patent
Bates (10) Patent No.: US 9,164,813 B2
(45) Date of Patent: Oct. 20, 2015

(54) USING A DEBUG ENGINE TO IDENTIFY THREADS THAT WAIT FOR A MUTEX

(75) Inventor: Cary L. Bates, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1104 days.

(21) Appl. No.: 12/969,926

(22) Filed: Dec. 16, 2010

(65) Prior Publication Data

US 2012/0159487 A1   Jun. 21, 2012

(51) Int. Cl.
*G06F 9/52* (2006.01)

(52) U.S. Cl.
CPC ...................................... *G06F 9/526* (2013.01)

(58) Field of Classification Search
CPC combination set(s) only.
See application file for complete search history.

(56) References Cited

U.S. PATENT DOCUMENTS

| 6,516,460 | B1 | 2/2003 | Merks et al. |
| 7,296,259 | B2 | 11/2007 | Betker et al. |
| 7,496,918 | B1* | 2/2009 | Dice et al. .................... 718/100 |
| 8,239,838 | B2* | 8/2012 | Yim et al. .................... 717/129 |
| 2004/0049712 | A1 | 3/2004 | Betker et al. |
| 2005/0229163 | A1* | 10/2005 | Bates et al. .................. 717/129 |
| 2008/0133977 | A1 | 6/2008 | Chun et al. |

OTHER PUBLICATIONS

Sidwell et al., "Non-stop Multi-Threaded Debugging in GDB," pp. 1-11, 2008.

* cited by examiner

*Primary Examiner* — Eric C Wai
(74) *Attorney, Agent, or Firm* — Owen J. Gamon; Matthew C. Zehrer (57) ABSTRACT

In an embodiment, a first thread of a plurality of threads of a program is halted. A subset of the plurality of threads are determined that are waiting for a mutex that is locked by the first thread while the first thread is halted. Identifiers of the subset of the plurality of threads are presented. The subset of the plurality of threads may have their execution directly blocked and/or indirectly blocked by a lock on the mutex by the first thread. In embodiment, the first thread is halted in response to the first thread encountering a breakpoint, and the subset of the plurality of threads do not halt in response to the first thread encountering the breakpoint.

18 Claims, 6 Drawing Sheets

FIG. 1

MUTEX DATA

| MUTEX ID (210) | OWNER (212) | |
|---|---|---|
| MUTEX X | THREAD A | 202 |
| MUTEX Y | THREAD A | 204 |
| MUTEX Z | THREAD B | 206 |
| MUTEX W | THREAD C | 208 |

THREAD DATA

| THREAD ID (310) | MUTEX ID FOR WHICH THE THREAD IS BLOCKED (312) | MUTEX IDS THE THREAD HAS LOCKED (314) | |
|---|---|---|---|
| THREAD A | MUTEX Z | MUTEX X, MUTEX Y | 302 |
| THREAD B |  | MUTEX Z | 304 |
| THREAD C | MUTEX Z | MUTEX W | 306 |
| THREAD D | MUTEX X |  | 308 |

USING A DEBUG ENGINE TO IDENTIFY THREADS THAT WAIT FOR A MUTEX

FIELD

An embodiment of the invention generally relates to computer systems and more particularly to multiple threads of a program that wait for a mutex.

BACKGROUND

Computer systems typically comprise a combination of computer programs and hardware, such as semiconductors, transistors, chips, circuit boards, storage devices, and processors. The computer programs are stored in the storage devices and are executed by the processors. Locating, analyzing, and correcting suspected faults in a computer program is a process known as "debugging." Bugs are problems, faults, or errors in a computer program. Typically, a programmer uses another computer program commonly known as a debugger to debug the program under development.

Conventional debuggers typically support three primary types of operations, which a computer programmer may request via a user interface. A first type is a breakpoint or address watch operation, which permits a programmer to identify with a breakpoint a precise instruction at which to halt execution of the program by the processor, or identify via an address watch, a memory location for the processor to monitor for content modification, at which time the program's execution is halted. The debugger may set a breakpoint by replacing a valid instruction at the location specified by the programmer with an invalid instruction, which causes a system exception when the program attempts to execute the invalid instruction, giving control of the processor to the debugger. The debugger may set an address watch via a function of the processor. As a result, when a program is executed by the debugger, the program executes on the processor in a normal fashion until the breakpoint is reached or the contents of the monitored memory location are written to, at which time the debugger halts execution of the program. A second type is a step operation, which permits a computer programmer to cause the processor to execute instructions in a program either one-by-one or in groups. After each instruction or group of instructions are executed, the debugger then halts execution of the program. Once the execution of the program is halted, either by step or breakpoint operations, conventional debuggers provide a third type of operation, which displays the content that is stored at various storage locations, in response to requests by the programmer. By this debugging process of halting the program at various instructions and examining the content of various storage locations, the programmer might eventually find the storage location whose stored content, such as an instruction or data, is incorrect or unexpected.

SUMMARY

A method, computer-readable storage medium, and computer system are provided. In an embodiment, a first thread of a plurality of threads of a program is halted. A subset of the plurality of threads are determined that are waiting for a mutex that is locked by the first thread while the first thread is halted. Identifiers of the subset of the plurality of threads are presented. The subset of the plurality of threads may have their execution directly blocked and/or indirectly blocked by a lock on the mutex by the first thread. In embodiment, the first thread is halted in response to the first thread encountering a breakpoint, and the subset of the plurality of threads do not halt in response to the first thread encountering the breakpoint.

It is to be noted, however, that the appended drawings illustrate only example embodiments of the invention, and are therefore not considered a limitation of the scope of other embodiments of the invention.

DETAILED DESCRIPTION

Figure 1:
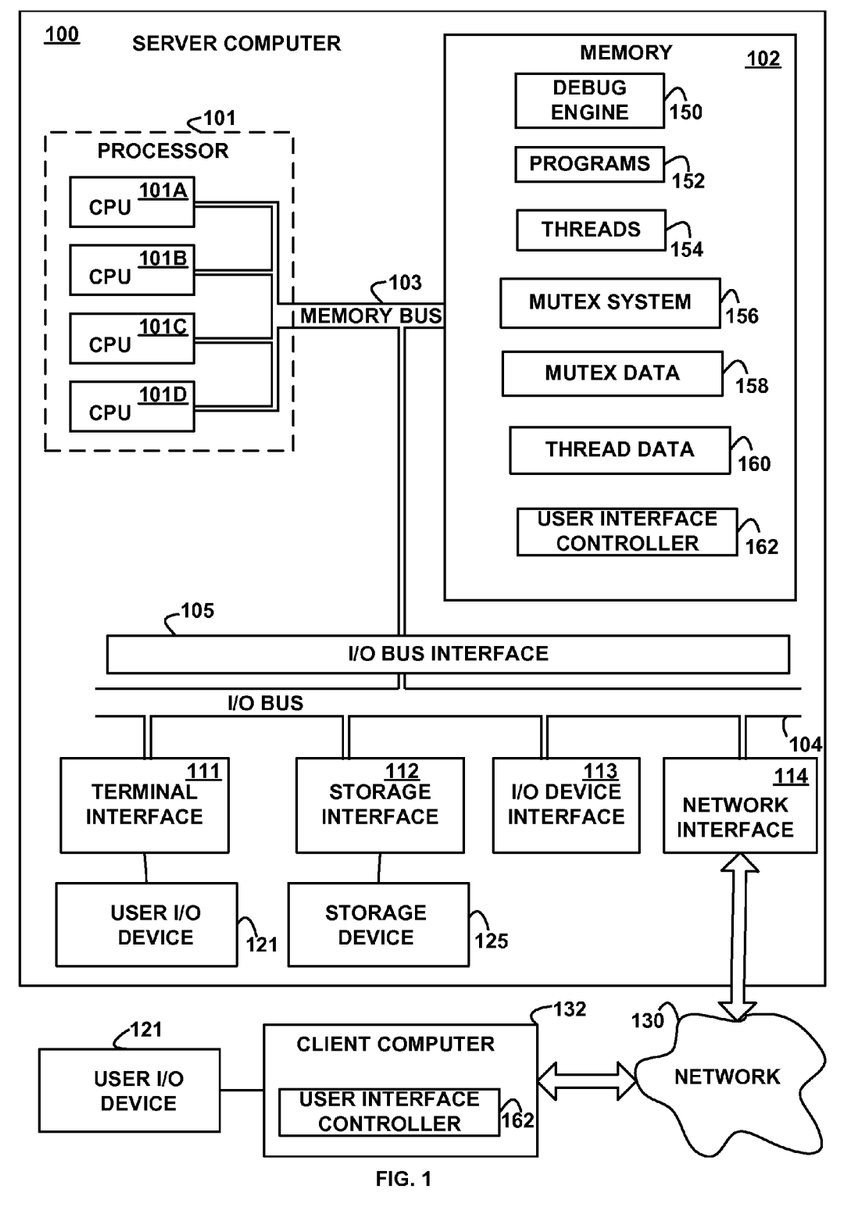
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is encoded with or stores a debug engine 150, programs 152, threads 154, a mutex system 156, mutex data 158, thread data 160, and a user interface controller 162. Although the debug engine 150, the programs 152, the threads 154, the mutex system 156, the mutex data 158, the thread data 160, and the user interface controller 162 are illustrated as being contained within the memory 102, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, the debug engine 150, the programs 152, the threads 154, the mutex system 156, the mutex data 158, the thread data 160, and the user interface controller 162 are not necessarily all completely contained in the same storage device at the same time. Further, although the debug engine 150, the programs 152, the threads 154, the mutex system 156, the mutex data 158, the thread data 160, and the user interface controller 162 are illustrated as being separate entities, in other embodiments some of them, portions of some of them, or all of them may be packaged together.

In an embodiment, the debug engine 150, the programs 152, the threads 154, the mutex system 156, and/or the user interface controller 162 comprise instructions or statements that execute on the processor 101 or instructions or statements that are interpreted by instructions or statements that execute on the processor 101, to carry out the functions as further described below with reference to FIGS. 2, 3, 4, 5, 6, and 7. In another embodiment, the debug engine 150, the programs 152, the threads 154, the mutex system 156, and/or the user interface controller 162 are implemented in hardware via semiconductor devices, chips, logical gates, circuits, circuit cards, and/or other physical hardware devices in lieu of, or in addition to, a processor-based system. In an embodiment, the debug engine 150, the programs 152, the threads 154, the mutex system 156, and/or the user interface controller 162 comprise data in addition to instructions or statements.

The program 152 is debugged via the debug engine 150. The program 152 may be any type of executable or interpretable code or statements, whether in source or object form. In various embodiments, the program 152 may be an application program, an operating system program, a network application program, an application server program, a server program, a grid program, a scientific calculation manager, a query optimizer, or any other type of program.

In various embodiment, the threads 154, which may also be known as processes or tasks, comprise instances of the same program 152, executing concurrently, simultaneously, or substantially simultaneously on the same or different processors via parallel computing, multi-tasking, or multiprocessing techniques. On a single processor, multithreading occurs by time-division multiplexing, as the single processor switches between different threads 154. This context switching occurs frequently enough that the user perceives the threads 154 as executing simultaneously. On a multiprocessor or multi-core computer system, the threads 154 actually execute simultaneously, with each processor or core executing a particular thread 154. In an embodiment, the threads 154 share resources, such as memory and/or a processor, but in other embodiment the threads 154 do not share resources. In an embodiment, all of the threads 154 comprise identical code, which are identical copies of the program 152. In another embodiment, some or all of the threads 154 comprise portions or subsets of the program 152, and the subsets may or may not overlap with each other.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer 132 may comprise some or all of the hardware and computer program elements of the computer 100. The client computer 132 may also comprise additional elements not illustrated for the computer 100. The client computer 132 may comprise a user interface controller 162 that manages a user interface presented or displayed via a user I/O device 121 that is connected to or contained within the client computer 132.

FIG. 1 is intended to depict the representative major components of the computer system 100, the network 130, and the client computer 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/ or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
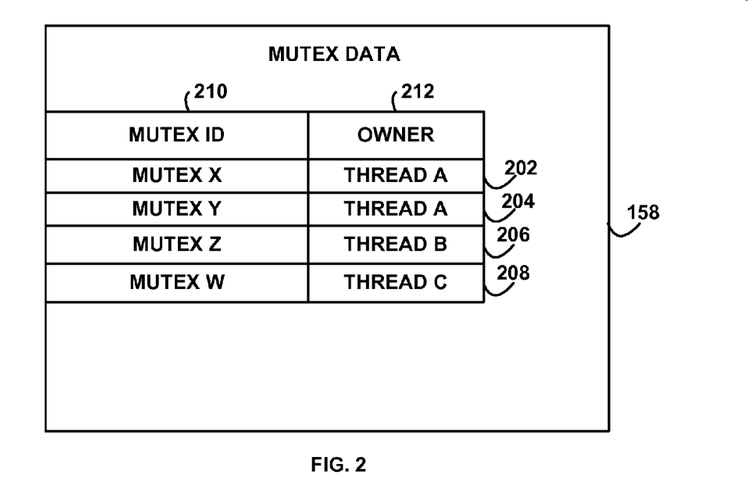
FIG. 2 depicts a block diagram of example mutex data, according to an embodiment of the invention.

FIG. 2 depicts a block diagram of an example mutex data 158, according to an embodiment of the invention. The mutex data 158 comprises example records 202, 204, 206, and 208, each of which comprises an example mutex identifier field 210 and an example owner identifier field 212. The example mutex identifier field 210 identifies a mutex that one of the threads 154 identified by the owner identifier field 212, in the same record, has locked. In various embodiments, the mutex is a program object that the mutex system 156 uses to negotiate and enforce mutual exclusion among the threads 154 that seek to access a common or shared resource. In various embodiments, the mutex may be implemented via a lock, a flag, or a semaphore. Examples of common resources include a counter, a queue, or a global variable. In an embodiment, the mutex data 158 may be inside the data object to which the mutex protects access.

Figure 3:
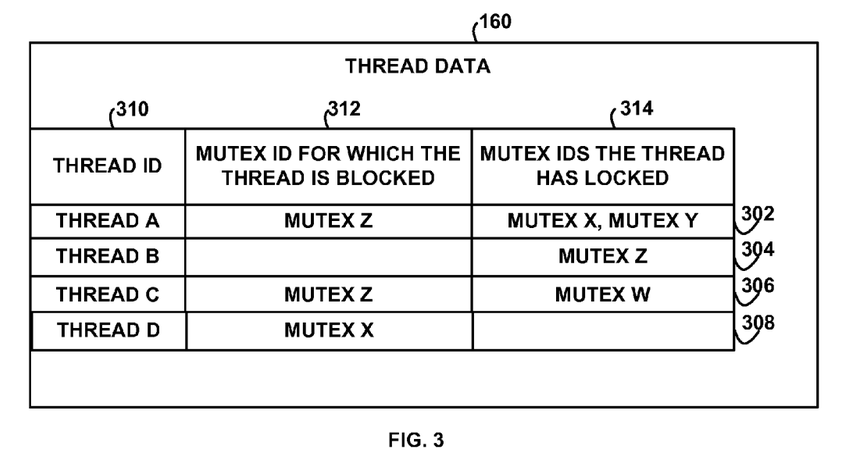
FIG. 3 depicts a block diagram of an example data structure for thread data, according to an embodiment of the invention.

FIG. 3 depicts a block diagram of an example data structure for thread data 160, according to an embodiment of the invention. The thread data 160 comprises example records 302, 304, 306, and 308, each of which comprises an example thread identifier field 310, an example blocked mutex identifier field 312, and an example locked mutex identifier field 314. The example thread identifier field 310 identifies one of the threads 154. The blocked mutex identifier field 312 identifies a mutex for which the thread identified by the thread identifier field 310, in the same record, is blocked and waiting for a lock on the mutex identified by the mutex identifier field 312. In an embodiment, a thread 154 can only be blocked (or waiting on) one mutex at a time because the thread 154 stops executing and waits if the request for the lock on the mutex by the thread cannot yet acquire (lock) the mutex, so the mutex identifier field 312 may specify a maximum of one mutex identifier. In another embodiment, a thread 154 may continue executing and perform other functions and access other data while waiting to lock the mutex identified by the mutex identifier field 312 and while waiting to access the data protected by the mutex identified by the mutex identifier field 312, so the mutex identifier field 312 may specify more than one mutex identifier.

The locked mutex identifier field 314 identifies the mutex that the thread identified by the thread identifier 310, in the same record, has locked or owns. A thread owning or locking a mutex means that the owning thread may proceed with execution or may access the data protected by the lock and means that no other thread may acquire, lock or own the mutex. Other of the threads 154 that request to lock the same mutex are blocked from continuing to execute and/or blocked from accessing the data protected by the lock of the mutex.

Figure 4:
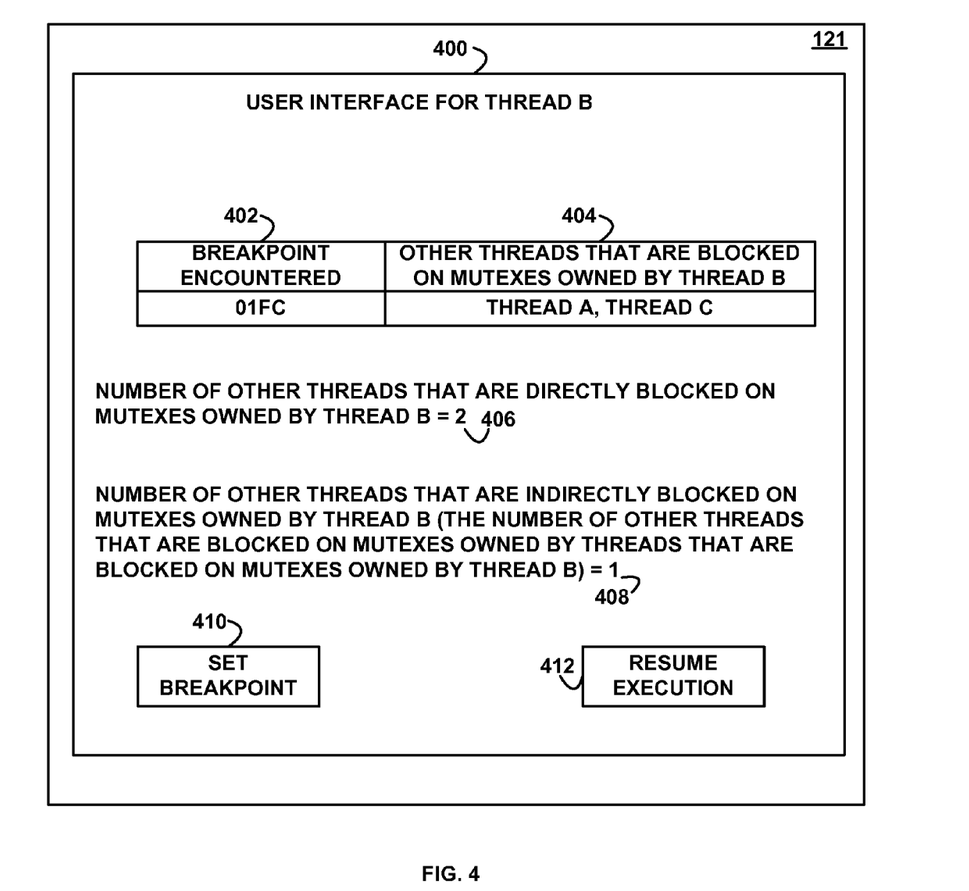
FIG. 4 depicts a block diagram of an example user interface presented via a user I/O (Input/Output) device, according to an embodiment of the invention.

FIG. 4 depicts a block diagram of an example user interface 400 presented or displayed via a user I/O (Input/Output) device 121, according to an embodiment of the invention. The user interface 400 comprises a display of a breakpoint address encountered field 402 and a thread identifier field 404. The breakpoint address encountered field 402 specifies an address, instruction number, or statement number of an instruction or statement in the program 152 and/or the instruction or statement, at which the execution of the example halted thread B (one of the threads 154) is halted. The thread identifier field 404 identifies a subset of the threads 154 (other than the halted thread B) whose execution is directly blocked by mutexes owned or locked by the halted thread B. In another embodiment, the thread identifier field 404 identifies a subset of the threads 154 (other than the halted thread B) whose execution is directly blocked by mutexes owned or locked by the halted thread B and another subset of the threads 154 whose execution is indirectly blocked by the mutexes owned or locked by the halted thread B. The debug engine 150 does not present identifiers of the threads whose execution is not blocked on mutexes owned or locked by the halted thread B. The user interface 400 further comprises a presentation of a number 406 of the threads 154 whose execution is directly blocked waiting for mutexes owned by the halted thread B. The user interface 400 further comprises a presentation of a number 408 of the threads 154 whose execution is indirectly blocked waiting for mutexes owned by the halted thread, that is, the number of other of the threads 154 whose execution is blocked waiting for mutexes that are owned or locked by the threads 154 whose execution is blocked waiting for mutexes that are owned or locked by the halted thread.

The user interface 400 further comprises a set breakpoint command 410 and a resume execution command 412. The selection of the respective command 410 or 412 via the user I/O device 121 sends the respective command to the debug engine 150 via the user interface controller 162 and requests that the debug engine 150 set a breakpoint at a specified instruction or statement address in the program 152 or requests that the debug engine 150 resume execution of the halted thread A of the program 152. Although the commands 410 and 412 are illustrated in FIG. 4 as buttons, in other embodiments, they may be textual commands entered via a command line, menu options, or commands entered via a speech recognition system.

Figure 5:
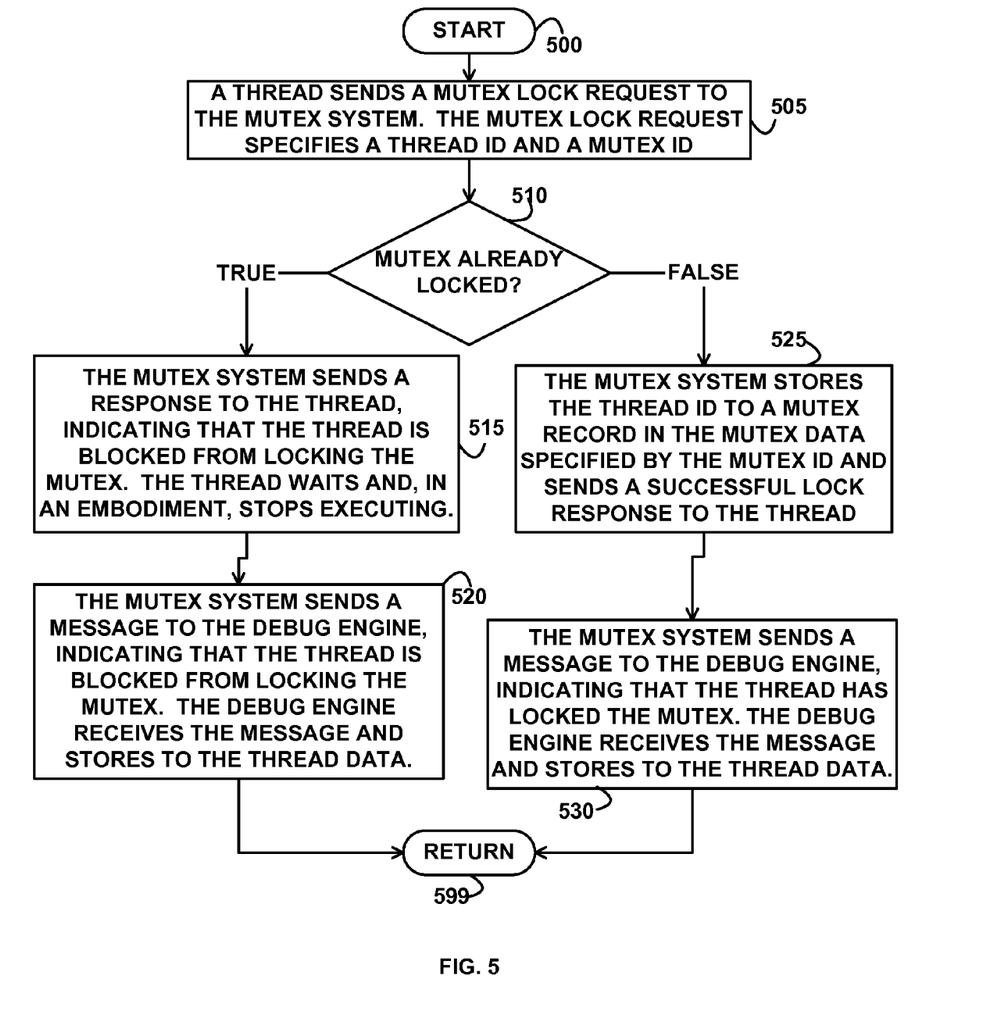
FIG. 5 depicts a flowchart of example processing for a mutex lock request, according to an embodiment of the invention.

FIG. 5 depicts a flowchart of example processing for a mutex lock request, according to an embodiment of the invention. The logic that implements the processing of FIG. 5 may be executed for each thread that requests a lock on any mutex. Control begins at block 500. Control then continues to block 505 where a thread sends a mutex lock request to the mutex system 156. The mutex lock request specifies a thread identifier of the requesting thread and a mutex identifier that identifies the mutex that the thread requests to lock. The mutex system 156 receives the mutex lock request. Control then continues to block 510 where the mutex system 156 determines whether the mutex identified by the mutex identifier is already locked by another of the threads 154.

If the determination at block 510 is true, then the mutex identified by the mutex identifier is already locked by another, blocking, thread of the threads 154, so control continues to block 515 where the mutex system 156 sends a response to the requesting blocked thread, indicating that the requesting thread is blocked from locking the mutex. In another embodiment, the mutex system 156 does not send a response to the requesting thread; instead, the requesting blocked thread waits for a successful response. In an embodiment, the requesting blocked thread waits for a successful response and stops executing until a successful response is received. In another embodiment, the requesting blocked thread does not stop executing and executes other functions and accesses other data and does not access data locked by the mutex while waiting for the lock on the mutex and a successful response. Control then continues to block 520 where the mutex system 156 sends a message to the debug engine 150, indicating that the requesting thread is blocked from locking the mutex and specifying an identifier of the blocked thread and an identifier of the thread that owns (has locked) the mutex that is blocking the blocked thread from locking the mutex. The debug engine 150 receives the message and stores the mutex identifier to the mutex identifier field 312 in a record in the thread data with a thread identifier 310 that matches (is identical to) the identifier of the requesting blocked thread. Control then continues to block 599 where the logic of FIG. 5 returns.

If the determination at block 510 is false, then the mutex identified by the mutex identifier is not already locked by another blocking thread, so control continues to block 525 where the mutex system 156 stores the mutex identifier and the thread identifier of the requesting thread to a record in the mutex data 158 in the mutex identifier field 210 and the owner field 212, respectively, and sends a successful lock response to the thread. In response to the successful lock response, the thread continues executing and may access data that is locked by the mutex. Control then continues to block 530 where the mutex system 156 sends a message to the debug engine 150, indicating that the requesting thread has locked the mutex and specifying an identifier of the requesting thread and an identifier of the mutex. The debug engine 150 receives the message and stores the received mutex identifier to the mutex identifier field 314 in a record in the thread data with a thread identifier 310 that matches (is identical to) the identifier of the requesting thread that now has locked the mutex. Control then continues to block 599 where the logic of FIG. 5 returns.

Figure 6:
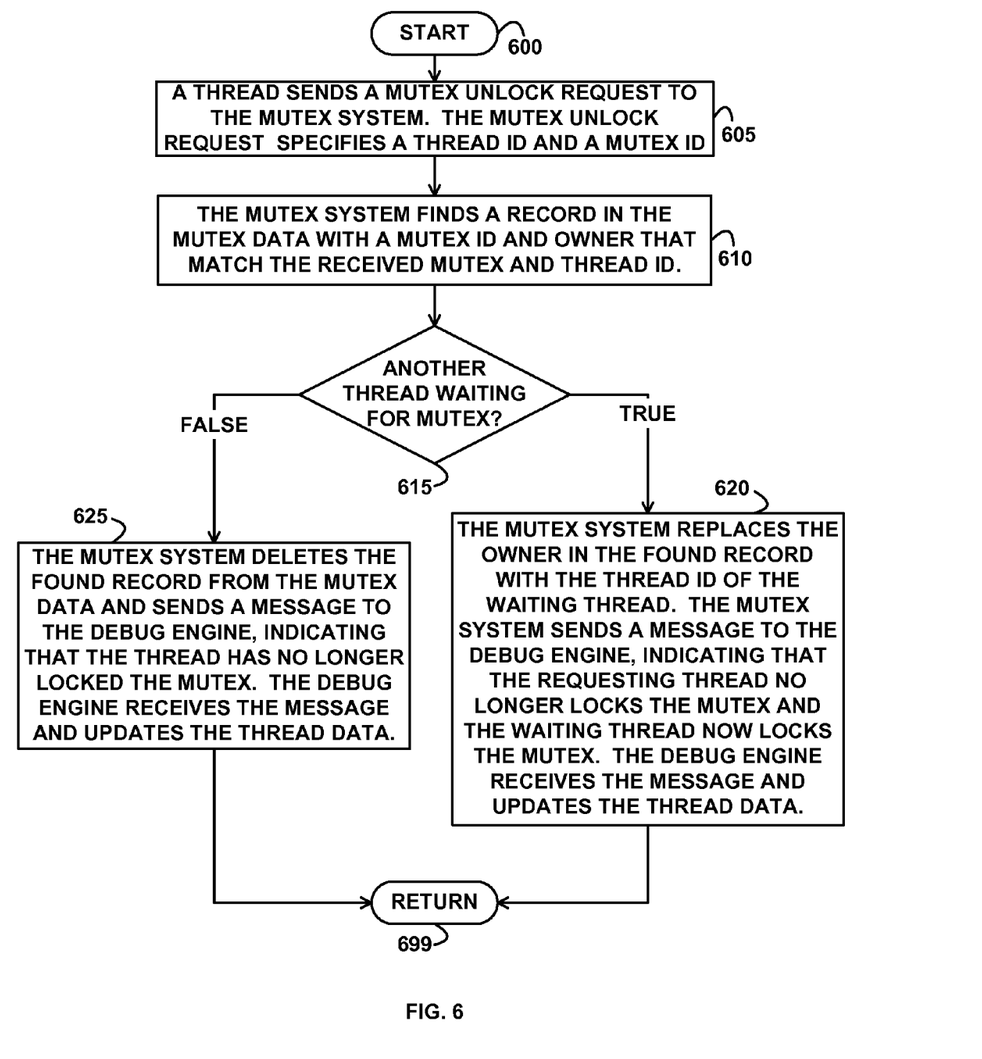
FIG. 6 depicts a flowchart of example processing for a mutex unlock request, according to an embodiment of the invention.

FIG. 6 depicts a flowchart of example processing for a mutex unlock request, according to an embodiment of the invention. The logic that implements the processing of FIG. 6 may be executed for each thread that requests a unlock of any mutex. Control begins at block 600. Control then continues to block 605 where a thread sends a mutex unlock request to the mutex system 156. The mutex unlock request specifies a thread identifier of the requesting thread and a mutex identifier that identifies the mutex that the thread requests to unlock. The mutex system 156 receives the mutex unlock request. Control then continues to block 610 where the mutex system 156 finds a record in the mutex data 158 with a mutex identifier 210 and owner 212 that match the received mutex identifier and thread identifier, respectively.

Control then continues to block 615 where the mutex system determines whether another, waiting, thread has previously sent a lock request for that mutex and is waiting for the mutex. If the determination at block 615 is true, then a waiting thread previously sent a lock request for that mutex and is waiting for the mutex, so control continues to block 620 where the mutex system replaces the owner in the found record with the thread identifier of the waiting thread. The mutex system further sends a message to the debug engine 150, indicating that the requesting thread that requested the unlock of the mutex no longer locks the mutex and the waiting thread now locks the mutex. The debug engine 150 receives the message and updates the thread data 160 by finding a record in the thread data 160 with a thread identifier that matches the requesting thread and modifying the mutex identifier field 314 in the same record to remove the mutex identifier that the requesting thread requested to unlock. The debug engine 150 further finds a record in the thread data 160 with a thread identifier 310 that matches the waiting thread and stores the mutex identifier of the mutex into the mutex identifier field 314 in the same record. Control then continues to block 699 where the logic of FIG. 6 returns.

If the determination at block 615 is false, then another thread is not waiting for the mutex that the requesting thread requested to unlock, so control continues to block 625 where the mutex system deletes the found record from the mutex data 158 and sends a message to the debug engine 150, indicating that the requesting thread no longer locks the mutex. The debug engine 150 receives the message and updates the thread data 160 by finding a record in the thread data 160 with a thread identifier 310 that matches the requesting thread and modifying the mutex identifier field 314, in the same record, to remove the mutex identifier that the requesting thread requested to unlock. Control then continues to block 699 where the logic of FIG. 6 returns.

Figure 7:
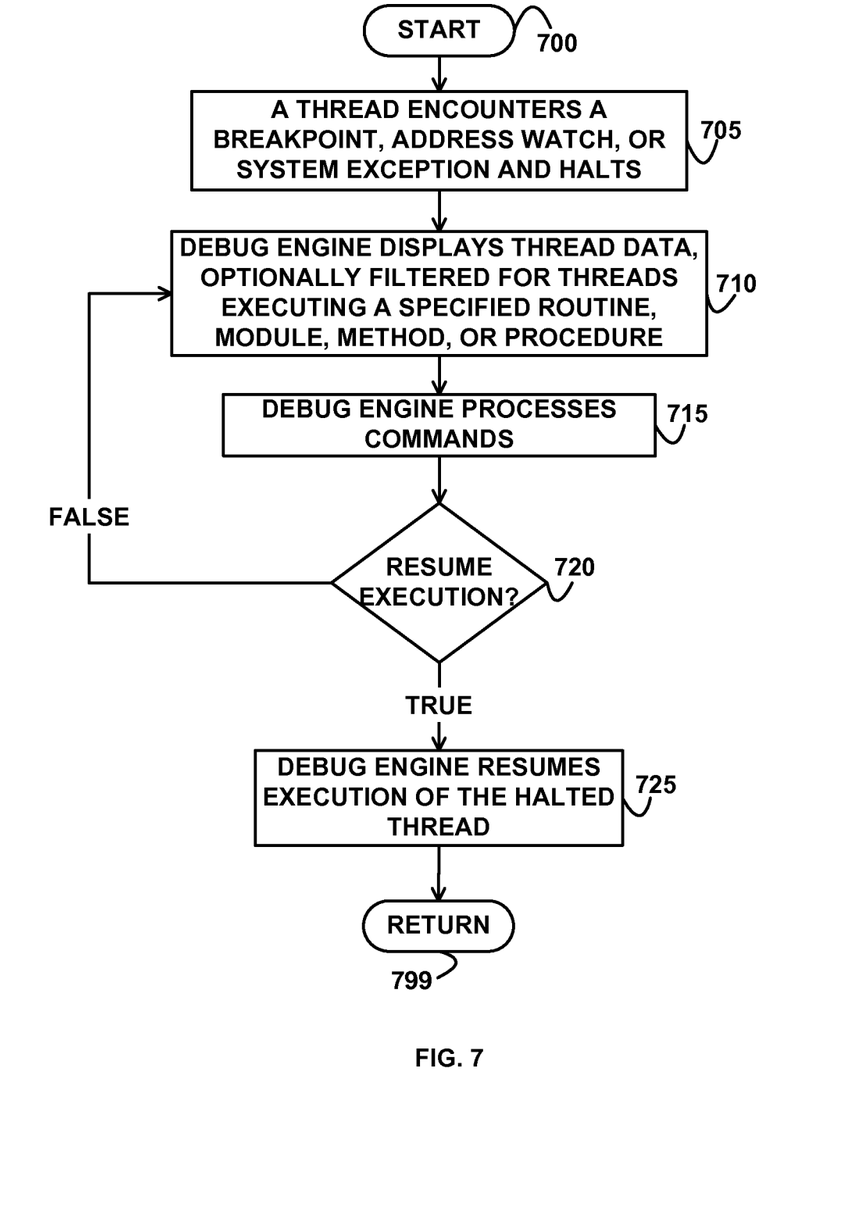
FIG. 7 depicts a flowchart of example processing for the halting of a thread, according to an embodiment of the invention.

FIG. 7 depicts a flowchart of example processing for the halting of a thread, according to an embodiment of the invention. The logic that implements the processing of FIG. 7 may be executed concurrently, substantially concurrently, or interleaved with the processing of FIGS. 5 and 6 on the same or a different processor, via the techniques of multi-programming, multi-tasking, or multi-threading.

Control begins at block 700. Control then continues to block 705 where a thread halts execution. In various embodiments, the thread halts execution in response to encountering a breakpoint, in response to encountering an address watch condition, or in response to a system exception. When a thread encounters a breakpoint and halts, all other of the threads 154 that did not encounter the breakpoint continue executing, via a technique that is known as non-stop debugging. Control then continues to block 710 where, in response to the halt of the thread, the debug engine 150 receives control of the processor 101 and displays the thread identifiers of threads 154 that are blocked by mutexes that are owned or locked by the halted thread via the user interface 400 and determines and displays the number of the threads 154 directly blocked by mutexes owned or locked by the halted thread and the number of threads 154 that are indirectly blocked by mutexes owned or locked by the halted thread. The threads 154 indirectly blocked by mutexes owned or locked by the halted thread are a first subset of the threads 154 that are blocked by mutexes locked by a second subset of the threads 154 that are blocked by mutexes owned by the halted thread. The terms "first" and "second" are used for convenience only to identify subsets.

The debug engine 150 finds the first subset of the threads 154 that are indirectly blocked as follows. The debug engine 150 finds the mutexes locked by the halted thread specified by the mutex identifier field 314 in the record in the thread data 160 with a thread identifier field 310 that matches the halted thread in the same record. Using the example thread data 160 in FIG. 3, the example record 304 in the thread data 160 depicts that the mutex Z is locked by the halted thread B. Thus, a second subset of threads waiting for the mutex Z have their execution directly blocked by the halt of the execution of the thread B, and a first subset of threads waiting for mutexes owned by the second subset are indirectly blocked.

The debug engine 150 then finds the records in the thread data 160 with mutex identifiers 312 that match the found mutexes that are locked by the halted thread B and reads the thread identifiers 310 from those found records. Using the example thread data 160 in FIG. 3, the example records 302 and 306 depict that the thread A and the thread C are blocked waiting for the mutex Z, which is locked by the halted thread B. Thus, the thread A and thread C are the example second subset of threads 154 that are directly blocked by the mutex Z, which is locked by the halted thread B. The debug engine 150 then reads the mutex identifiers 314 in the records with thread identifiers that match the thread identifiers of the example second subset of the threads 154, which in the example of FIG. 3 are the mutex identifiers 314 of the mutex X and the mutex Y, which are locked by the thread A, in record 302 and the mutex W, which is locked by the thread C, in the record 306. The debug engine 150 then searches for records with the mutex X, the mutex Y, and the mutex W, in the mutex identifier 312 and reads the thread identifier 310 from the records found by that search. In the example of FIG. 3, the record 308 comprises mutex X in the mutex identifier field 312, so the debug engine 150 reads the thread identifier 310 of thread D from the record 308. Thus, in this example, the thread D is the first subset of the threads 154 which is indirectly blocked by the halted thread B because the halted thread B has locked mutex Z, which is blocking the thread A and the thread C, and the thread A and C have the mutex X, the mutex Y, and the mutex W locked, which are blocking the thread D.

In an embodiment, the debug engine 150 optionally filters the displayed data for the threads 404 in the user interface 400 that execute a specified routine, module, method, procedure, or other unit of the thread. For example, the debug engine 150 displays, in the thread identifier field 404, the identifiers of the threads 154 that are executing routines, modules, methods, procedures, or other units of the thread specified by the user via the user I/O device 121 and does not display, in the thread identifier field 404, identifiers of the threads 154 that are executing units of a thread not specified by the user via the user I/O device 121. The debug engine 150 may read the call stacks of all the threads 154 to find the procedures, routines, modules, or methods that the threads 154 are executing.

Control then continues to block 715 where the debug engine 150 receives and processes commands received from the user interface via the user I/O device 121, for example, the set breakpoint command 410 or the resume execution command 412. Control then continues to block 720 where the debug engine 150 determines whether the received command is the resume execution command. If the determination at block 720 is true, then the received command is the resume execution command, so control continues to block 725 where the debug engine 150 replaced the halted, invalid instruction in the thread with the original, saved valid instruction resumes the halted thread executing on the processor 101. Control then continues to block 799 where the logic of FIG. 7 returns. If the determination at block 720 is false, then the received command is not a resume execution command, so control returns to block 710 where the debug again displays the thread data, as previously described above. Since the logic of FIG. 7 executes concurrently with the logic of FIGS. 5 and 6, the thread data 160 may have been updated by the logic of FIGS. 5 and 6 and thus may be different from the previous thread data 160 displayed by the previous iteration of the loop that starts at block 710.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention.

In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   halting, with a debug engine, a first thread of a plurality of threads of a program in response to the first thread encountering a breakpoint;
   determining, with the debug engine, a first subset of the plurality of threads that are waiting for a first mutex that is locked by the first thread while the first thread is halted, wherein the first mutex is locked by the first thread sending a mutex lock request to a mutex system that enforces mutual exclusion, and storing, with the debug engine, thread data received from the mutex system indicating the first mutex is locked by the first thread;
   executing, with the debug engine, a second subset of the plurality of threads that are not waiting for the first mutex;
   determining, with the debug engine, identifiers of the first subset of the plurality of threads;
   responsive to the halting, presenting upon a user interface the identifiers of the first subset of the plurality of threads and an identifier of the first thread, wherein presenting the first subset of the plurality of threads further comprises displaying a breakpoint address field that identifies the breakpoint and displaying a thread identifier field that identifies the first subset of the plurality of threads, and;
   receiving, with the mutex system, a mutex unlock request to unlock the first mutex from the first thread, the mutex unlock request comprising an identifier of the first thread and an identifier of the first mutex locked by the first thread;
   determining, with the mutex system, by querying a mutex data record that indicates whether the first thread owns the first mutex, and;
   responsive to the determining that the first thread owns the first mutex, updating the mutex data record, with the mutex system, to indicate a second waiting thread now owns the first mutex and storing, with the debug engine, thread data received from the mutex system indicating the first mutex is owned by the second thread.

2. The method of claim 1, wherein the determining the first subset of the plurality of threads that are waiting for the first mutex further comprises:
   determining the first subset of the plurality of threads whose execution is directly blocked by a lock on the first mutex by the first thread.

3. The method of claim 1, wherein the determining the first subset of the plurality of threads that are waiting for the first mutex further comprises:
   determining the first subset of the plurality of threads whose execution is indirectly blocked by a lock on the first mutex by the first thread.

4. The method of claim 3, wherein the determining the first subset of the plurality of threads whose execution is indirectly blocked by the lock on the first mutex by the first thread further comprises:
   determining the first subset of the plurality of threads whose execution is blocked by waiting on a second mutex locked by a third subset of the plurality of threads, wherein the third subset of the plurality of threads is blocked by waiting on the first mutex locked by the first thread.

5. The method of claim 1, wherein the first subset of the plurality of threads do not halt in response to the first thread encountering the breakpoint.

6. The method of claim 1, wherein the first subset of the plurality of threads halt execution while waiting for the first mutex that is locked by the first thread.

7. A non-transitory computer-readable storage medium encoded with instructions, wherein the instructions when executed comprise:
   halting, with a debug engine, a first thread of a plurality of threads of a program in response to the first thread encountering a breakpoint;
   determining, with the debug engine, a first subset of the plurality of threads that are waiting for a first mutex that is locked by the first thread while the first thread is halted, wherein the first mutex is locked by the first thread sending a mutex lock request to a mutex system that enforces mutual exclusion, and storing, with the debug engine, thread data received from the mutex system indicating the first mutex is locked by the first thread;
   executing, with the debug engine, a second subset of the plurality of threads that are not waiting for the first mutex;
   determining, with the debug engine, identifiers of the first subset of the plurality of threads;
   responsive to the halting, presenting upon a user interface the identifiers of the first subset of the plurality of threads and an identifier of the first thread, wherein presenting the first subset of the plurality of threads further comprises displaying a breakpoint address field that identifies the breakpoint and displaying a thread identifier field that identifies the first subset of the plurality of threads, and:
   receiving, with the mutex system, a mutex unlock request to unlock the first mutex from the first thread, the mutex unlock request comprising an identifier of the first thread and an identifier of the first mutex locked by the first thread;
   determining, with the mutex system, by querying a mutex data record that indicates whether the first thread owns the first mutex, and;
   responsive to the determining that the first thread owns the first mutex, updating the mutex data record, with the mutex system, to indicate a second waiting thread now owns the first mutex and storing, with the debug engine, thread data received from the mutex system indicating the first mutex is owned by the second thread.

8. The non-transitory computer-readable storage medium of claim 7, wherein the determining the first subset of the plurality of threads that are waiting for the first mutex further comprises:
 determining the first subset of the plurality of threads whose execution is directly blocked by a lock on the first mutex by the first thread.

9. The non-transitory computer-readable storage medium of claim 7, wherein the determining the first subset of the plurality of threads that are waiting for the first mutex further comprises:
 determining the first subset of the plurality of threads whose execution is indirectly blocked by a lock on the first mutex by the first thread.

10. The non-transitory computer-readable storage medium of claim 9, wherein the determining the first subset of the plurality of threads whose execution is indirectly blocked by the lock on the first mutex by the first thread further comprises:
 determining the first subset of the plurality of threads whose execution is blocked by waiting on a second mutex locked by a third subset of the plurality of threads, wherein the third subset of the plurality of threads is blocked by waiting on the first mutex locked by the first thread.

11. The non-transitory computer-readable storage medium of claim 7, wherein the first subset of the plurality of threads do not halt in response to the first thread encountering the breakpoint.

12. The non-transitory computer-readable storage medium of claim 7, wherein the first subset of the plurality of threads halt execution while waiting for the first mutex that is locked by the first thread.

13. A computer comprising:
 a processor; and
 memory communicatively coupled to the processor, wherein the memory is encoded with instructions, wherein the instructions when executed on the processor comprise:
  halting, with a debug engine, a first thread of a plurality of threads of a program, wherein the halting the first thread further comprises in response to the first thread encountering a breakpoint,
  determining, with the debug engine, a first subset of the plurality of threads that are waiting for a first mutex that is locked by the first thread while the first thread is halted, wherein the first mutex is locked by the first thread sending a mutex lock request to a mutex system that enforces mutual exclusion, and storing, with the debug engine, thread data received from the mutex system indicating the first mutex is locked by the first thread;
  executing, with the debug engine, a second subset of the plurality of threads that are not waiting for the first mutex;
  determining, with the debug engine, identifiers of the first subset of the plurality of threads;
  responsive to the halting, presenting upon a user interface the identifiers of the first subset of the plurality of threads and an identifier of the first thread, wherein presenting the first subset of the plurality of threads further comprises displaying a breakpoint address field that identifies the breakpoint and displaying a thread identifier field that identifies the first subset of the plurality of threads, and:
  receiving, with the mutex system, a mutex unlock request to unlock the first mutex from the first thread, the mutex unlock request comprising an identifier of the first thread and an identifier of the first mutex locked by the first thread;
  determining, with the mutex system, by querying a mutex data record, that indicates whether the first thread owns the first mutex, and;
  responsive to the determining that the first thread owns the first mutex, updating the mutex data record, with the mutex system, to indicate a second waiting thread now owns the first mutex and storing, with the debug engine, thread data received from the mutex system indicating the first mutex is owned by the second thread.

14. The computer of claim 13, wherein the determining the first subset of the plurality of threads that are waiting for the first mutex further comprises:
 determining the first subset of the plurality of threads whose execution is directly blocked by a lock on the first mutex by the first thread.

15. The computer of claim 13, wherein the determining the first subset of the plurality of threads that are waiting for the first mutex further comprises:
 determining the first subset of the plurality of threads whose execution is indirectly blocked by a lock on the first mutex by the first thread.

16. The computer of claim 15, wherein the determining the first subset of the plurality of threads whose execution is indirectly blocked by the lock on the first mutex by the first thread further comprises:
 determining the first subset of the plurality of threads whose execution is blocked by waiting on a second mutex locked by a third subset of the plurality of threads, wherein the third subset of the plurality of threads is blocked by waiting on the first mutex locked by the first thread.

17. The computer of claim 13, wherein the first subset of the plurality of threads do not halt in response to the first thread encountering the breakpoint.

18. The computer of claim 13, wherein the first subset of the plurality of threads halt execution while waiting for the first mutex that is locked by the first thread.

* * * * *